United States Patent
Drachmann et al.

(10) Patent No.: US 11,846,534 B2
(45) Date of Patent: Dec. 19, 2023

(54) CONSUMPTION METER, A CALIBRATION SYSTEM AND A METHOD OF CALIBRATION

(71) Applicant: Apator Miitors ApS, Aarhus V (DK)

(72) Inventors: Jens Drachmann, Viby J (DK); Kresten Helstrup, Århus C (DK)

(73) Assignee: APATOR MIITORS APS, Aarhus V (DK)

( * ) Notice: Subject to any disclaimer, the term of this patent is extended or adjusted under 35 U.S.C. 154(b) by 10 days.

(21) Appl. No.: 17/606,498

(22) PCT Filed: Apr. 30, 2019

(86) PCT No.: PCT/DK2019/050132
§ 371 (c)(1),
(2) Date: Oct. 26, 2021

(87) PCT Pub. No.: WO2020/221401
PCT Pub. Date: Nov. 5, 2020

(65) Prior Publication Data
US 2022/0205826 A1    Jun. 30, 2022

(51) Int. Cl.
*G01F 25/10* (2022.01)
*G01F 15/063* (2022.01)
(Continued)

(52) U.S. Cl.
CPC ............ *G01F 15/063* (2013.01); *G01F 25/10* (2022.01); *G01F 25/20* (2022.01); *H04Q 9/02* (2013.01);
(Continued)

(58) Field of Classification Search
None
See application file for complete search history.

(56) References Cited

U.S. PATENT DOCUMENTS

| | | | |
|---|---|---|---|
| 2017/0160124 A1* | 6/2017 | Drachmann | ............ G01F 25/10 |
| 2020/0072661 A1* | 3/2020 | Forster-Knight | ....... G01M 3/28 |

FOREIGN PATENT DOCUMENTS

| | | | | |
|---|---|---|---|---|
| CN | 103765915 A | * | 4/2014 | ............. G01D 21/00 |
| EP | 3184984 A1 | | 6/2017 | |

(Continued)

OTHER PUBLICATIONS

CN-103765915-A English Language Translation (Year: 2014).*
(Continued)

*Primary Examiner* — Curtis A Kuntz
*Assistant Examiner* — Jerold B Murphy
(74) *Attorney, Agent, or Firm* — Lee & Hayes P.C.

(57) ABSTRACT

A battery-powered consumption meter (10) is provided, which comprises a measurement means for measuring a value relating to an accumulated volume of a fluid flowing (41) in a connected fluid pipe system (40) to make up a consumption meter representation of the accumulated volume, and a first communication means (11), which is a wireless two-way communication means arranged for transmitting (14*d*) the consumption meter representation from the consumption meter (10) to an external device (20) external to the consumption meter (10), and for receiving a communication (14*a*, 14*b*, 14*c*) therefrom, the consumption meter (10) having at least two modes of operation comprising: a normal operation mode, and a calibration mode different from the normal operation mode, wherein in calibration mode the consumption meter (10) is arranged to transmit the consumption meter representation (14*d*) to the external device (20) in response to a request (14*c*) therefor from the external device (20). A calibration system (100) and a method of calibration are provided as well, the consumption meter (10), the calibration system (100) and the method of calibration providing energy-saving over the prior art.

18 Claims, 4 Drawing Sheets

Figure 1:
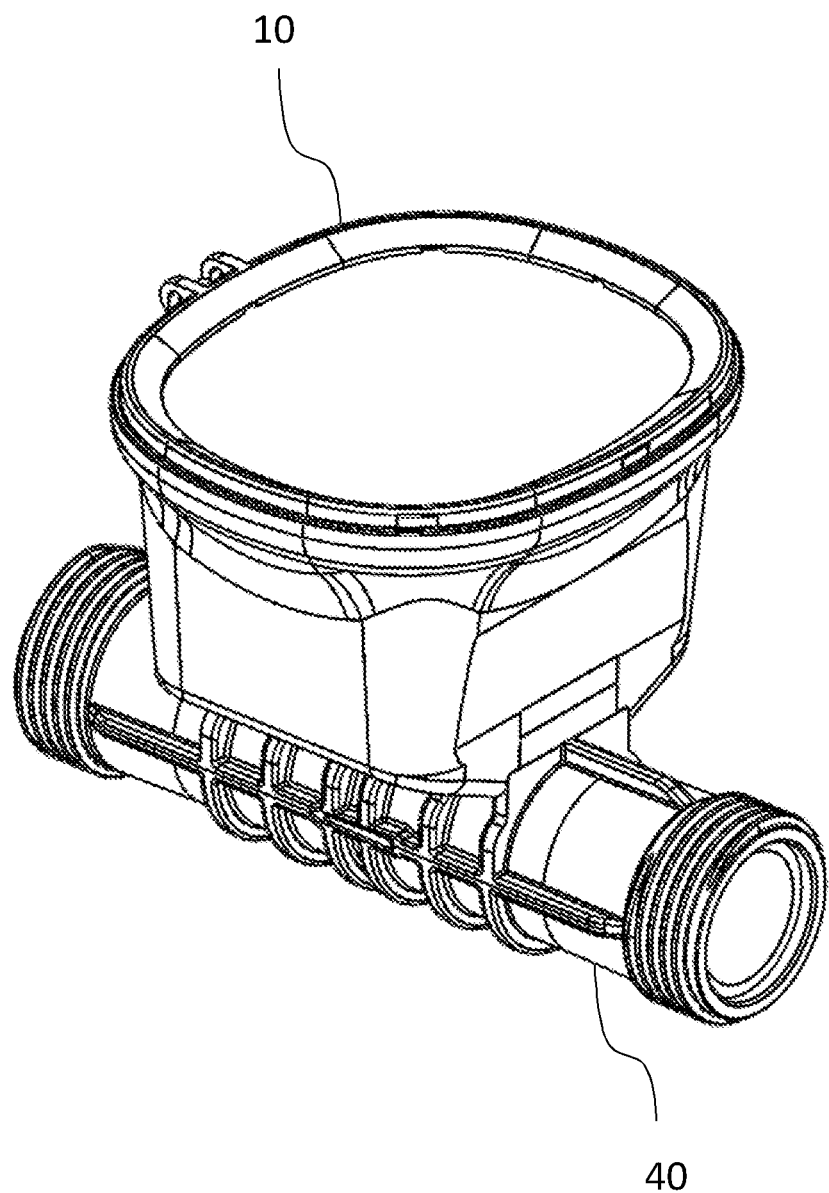

(51) Int. Cl.
*G01D 18/00* (2006.01)
*G01F 25/20* (2022.01)
*H04Q 9/02* (2006.01)

(52) U.S. Cl.
CPC ..... *H04Q 2209/40* (2013.01); *H04Q 2209/60* (2013.01)

(56) References Cited

FOREIGN PATENT DOCUMENTS

| WO | WO2007/13169 | A2 | 11/2007 |
| WO | WO2007/131169 | A2 | 11/2007 |
| WO | WO2016/008485 | A1 | 1/2016 |
| WO | WO2018/128538 | A1 | 7/2018 |

OTHER PUBLICATIONS

International Search Report and Written Opinion dated Jan. 8, 2020 in International Application No. PCT/DK2019/050132, 12 pages.

* cited by examiner

CONSUMPTION METER, A CALIBRATION SYSTEM AND A METHOD OF CALIBRATION

CROSS REFERENCE TO RELATED APPLICATIONS

This application is a U.S. National Phase Application of International Application PCT/DK2019/050132, filed Apr. 30, 2019, which is hereby incorporated by reference in its entirety.

FIELD OF THE INVENTION

The present invention relates to a consumption meter, a calibration system for calibration of a consumption meter, and a method of calibration of a consumption meter, such as a wireless consumption meter, such as an ultrasonic flow meter for measuring an accumulated volume and determining a consumption of a utility such as water, district heating, or gas.

BACKGROUND OF THE INVENTION

When a wireless consumption meter is calibrated, the amount of data transmitted from the consumption meter is typically much larger than the amount of data transmitted during normal operation. Apart from potential problems with regulatory requirements restricting such transmissions with respect to how often and how much may be transmitted in terms of duty cycle, effect, etc., the increased amount of data to be transmitted also severely reduces the expected lifetime of the battery supplying the consumption meter as data transmission is one of the most power-consuming functions of such consumption meters. Another critical factor of the calibration is the loss of one or more data packages, which may cause incorrect calibration of the consumption meter.

Internationally published patent application WO 2016/008485 A1 to Apator Miitors ApS of Denmark discloses a consumption meter, as well as a system for and a method of calibration of a consumption meter, according to which the consumption meter may be set to a calibration mode different from its normal operation mode, and wherein, in the calibration mode, energy saving initiatives such as transmitting shorter data packages at lower transmission power and at higher baud rate are pursued.

With this prior art, the same communication facility of the consumption meter as used in normal operation mode is used in calibration mode as well, however, modified in terms of the above parameters.

Still, however, there is a need for alternative energy-saving configurations for calibration of battery-powered consumption meters.

SUMMARY OF THE INVENTION

The inventors have identified the above-mentioned problems and challenges related to calibration of consumption meters, and subsequently made the below-described invention which may relate to an object of the present invention to provide a consumption meter and a related system and method which save energy compared to the consumption meters, systems and methods known in the art.

Thus, in a first aspect a battery-powered consumption meter is provided, comprising a measurement means for measuring a value relating to an accumulated volume of a fluid flowing in a connected fluid pipe system to make up a consumption meter representation of the accumulated volume, and a first communication means, which is a wireless two-way communication means arranged for transmitting the consumption meter representation from the consumption meter to an external device external to the consumption meter, and for receiving a communication therefrom, wherein the consumption meter has at least two modes of operation comprising a normal operation mode, and a calibration mode different from the normal operation mode, wherein in calibration mode the consumption meter is arranged to transmit the consumption meter representation to the external device in response to a request therefor from the external device.

According to the invention, a wireless consumption meter is provided with a particularly advantageous calibration mode for allowing calibration of the consumption meter using less energy than known in the prior art.

According to the invention the consumption meter is battery-powered. With battery-powered consumption meters, such as battery-powered consumption meters for utilities such as water, gas or district heating, long battery life time is an important parameter as such meters may be remotely arranged with each end-user, such as in a water meter pit at the premises of the end-user, and their batteries not easily replaced.

Therefore, with battery-powered consumption meters, energy-saving during calibration is an important step to improve the battery life time.

Further according to the present invention, the consumption meter comprises a measurement means to make up a consumption meter representation of the accumulated volume of the fluid in question. Utilities are billed according to the supplied accumulated volume, and with district heating additionally according to the heat content thereof. Accordingly, the consumption meter is arranged to have measured at any time the accumulated supplied volume of the utility, such as by measuring and integrating the flow of the subject utility. The consumption meter representation, which in the context of the present invention is the current output of the consumption meter, comprises at any time the accumulated volume of the utility. The measurement means, also referred to as flow metering part of the consumption meter, may be implemented in various ways known by the skilled person, such as by ultrasonic flow metering technologies, preferably comprising two ultrasonic transducers transmitting ultrasonic signals back and forth along the fluid flow, or such as by other electronically detectable flow metering technologies whether mechanical, ultrasonic, electromagnetic inductive, etc.

Also, according to the invention, the consumption meter comprises a first communication means, which is a wireless two-way communication means, and which is arranged for transmitting the consumption meter representation from the consumption meter to an external device. The first communication means is also referred to as first communication interface. Being a two-ways communication means, the communication means is also arranged for receiving communications from the external device. Thus, the consumption meter is able to transmit consumption meter representations to the external device and to receive communications therefrom. Likewise, the external device is able to receive consumption meter representations from the consumption meter, and to transmit communications thereto, such as commands or requests.

The external device is a device which is arranged externally to the consumption meter, which makes up an interface to the consumption meter during calibration, which controls the calibration of the consumption meter per se and which controls any reference devices and other hardware involved in the calibration as well. The external device may comprise a single device, or may comprises two or more separate devices, such as a calibration box and a control unit, the calibration box making up the interface between the control unit and the consumption meter under calibration. The external device and any reference devices and other hardware may be integrated or provided as separate devices.

According to the invention the consumption meter has at least two modes of operation: a normal operation mode, and a calibration mode different from the normal operation mode. The normal operation mode refers to the mode of the consumption meter being arranged in a utility network at a consumer's premises and operating to measure and communicate the utility supplied to the consumer according to this mode. In particular, no calibration of the consumption meter takes place during normal operation.

The calibration mode is different therefrom; in calibration mode the consumption meter is arranged to be calibrated, i.e. tested for and mapped in terms of its correct operation in terms of its ability to measure correctly the accumulated volume of a fluid flowing in a flow pipe of the consumption meter. Typically, in calibration mode the consumption meter is arranged to more frequently measure and communicate the accumulated volume than in the normal operation mode.

With the present invention, in calibration mode the consumption meter is arranged to transmit the consumption meter representation to the external device in response to a request therefor from the external device.

In the prior art, in normal operation mode and in calibration mode, the consumption meter typically repeatedly transmits its consumption meter representations at predefined intervals once the subject mode has been entered into and until it is left. Also, in the prior art, in calibration mode the intervals are shorter than in the normal operation mode, and thus the communication more energy-consuming.

In contrast, with the present invention, the consumption meter transmits its consumption meter representation only when requested by the external device, i.e. only upon request from the external device, and preferably only once or a few times. Thus, whereas in the prior art the consumption meter repeatedly tweets its consumption meter representation by "tweet-tweet-tweet"-ing in calibration mode, with the present invention the consumption meter in calibration mode makes a single "tweet" only, and only when asked therefore by the external device.

According to the present invention "the consumption meter is arranged to transmit the consumption meter representation to the external device". In the context of the present invention the term "to transmit" should be understood as an active or a passive transmission from the consumption meter to the external device. Thus, in the context of the present invention the representation may be actively transmitted from the consumption meter to the external device such as by radio signal transmission, or it may be passively transmitted, i.e. it may be "picked up" by the external device from the consumption meter, such as from a passive radio frequency identification facility (RFID) of the consumption meter.

Further to the definition of the calibration mode, the consumption meter under investigation is calibrated in terms of its ability to measure correctly the accumulated volume of the fluid flowing in the flow pipe with the consumption meter. By "measuring correctly the accumulated volume" calibration basically involves that a volume of liquid measured by the consumption meter under calibration is also measured by a reference device arranged with the flow pipe. With the calibration the accumulated volumes measured with the consumption meter and with the reference device are compared, and any deviation of the accumulated volume measured by the consumption meter over the accumulated volume measured by the reference device registered.

As a follow-up on the calibration an adjustment may be performed: based on the registration of the deviation of accumulated volumes measured by the consumption meter and reference device, the consumption meter may be adjusted, i.e. brought into a state of performance where its reading, i.e. its measured accumulated volume, agrees with the measured accumulated volume of the reference device. It should be understood, however, that the adjustment is not part of the calibration.

Per example, in a calibration session, the reference device measures an accumulated volume of liquid of 10.00 liters. The same accumulated volume of liquid is measured by the consumption meter under calibration, however, the reading of the consumption meter from measuring the volume is 10.20 liters. Accordingly, the accumulated volume measured by the consumption meter deviates by 0.20 liters over the accumulated volume measured by the reference device, i.e. on a relative scale the reading of the consumption meter exceeds the reading of the reference device by 2.0%. This is the result of the calibration.

As described above the consumption meter under calibration may then be adjusted, i.e. correcting the reading according to the calibration result, i.e. reducing the subject reading from 10.20 liters to the correct value of 10.00 liters, i.e. on a relative scale reducing the reading by 1.96%. Assuming reproducibility during the calibration and adjustment, repeating the above calibration session, both of the reference device and the consumption meter will now have readings of 10.00 liters.

As stated above, calibration relates to the accumulated volume measured by the consumption meter. In a simple form, with the above example, the volume of liquid may be arranged to flow through the flow pipe to be measured by both of the consumption meter and the reference device, and be collected in a simple bucket on a balance and weighed, in this case 10.00 liters weighing 10.00 kilograms. Also, the volume may as well be weighed beforehand, i.e. before flowing through the flow pipe, and it may be controlled that no liquid is lost during the session.

Time is not an issue with a calibration session, for example such as the above. Whether the flow is small, such as if the volume of 10.00 liters flows through the flow pipe in 50 minutes, i.e. at a flow rate of 0.200 liters per minute, or high, such if the volume of 10.00 flows through the flow tube in 2 minutes, i.e. at a flow rate of 5.00 liters per minute, the accumulated volume is still 10.00 liters, independently of the flow rate. Thus, with this embodiment of the invention, no need exists for clocking the session.

In the context of the invention, it should be understood that the consumption meter representation may comprise a first and a second accumulated volume, or it may comprise an accumulated volume difference between a first and a second measured accumulated volume.

Thus, per example, a consumption meter representation may comprise a first accumulated volume of V1=2.00 liters, and a second accumulated volume is V2=12.00 liters, or, per the same example, the consumption meter representation may comprise the accumulated volume difference of V2−V1=10.00 liters. Of course, this accumulated volume difference V2−V1 corresponds to the difference between the above first and second accumulated volumes, V1 and V2.

In an advantageous embodiment of the invention, the first communication means comprises near field communication (NFC) means, such as an NFC interface. With this embodiment, the transmission of the consumption meter representation from the consumption meter to the external device may be done by NFC by arranging the external device having a corresponding NFC interface close to the consumption meter. NFC is preferably conducted at a frequency between 10 MHz and 100 MHz and over a distance of less than 50 cm, preferably less than 10 cm, and at the commonly used NFC frequency of 13.56 MHz. Thus, NFC allows for the transmission of the consumption meter representation to be made in a very simple way from the consumption meter to the external device, such as from the consumption meter to a calibration box, when arranging the calibration box in the vicinity of the consumption meter.

By using the short range near field communication technology for communication between the consumption meter and the external device, it may be avoided that other consumption meters nearby and other external devices are able to receive the transmitted signals. Thereby is ensured that only the intended consumption meter receives the communications from the external device, and that only the intended external device receives the transmission with the consumption meter representation from the consumption meter. Another advantage of this is that identification data may be omitted from some or all communications, as it can easily be achieved that communications are only received from one device at a time by not having other devices within the short range.

Advantageously with this embodiment, the short range communication by NFC between the consumption meter and the external device is less energy-consuming than longer range communication, such as radio communication.

Also, NFC may be powered by the external device, such as by a rechargeable battery thereof, thus not consuming any energy from the battery of the battery-powered consumption meter for communication purposes.

Additionally, and further advantageously with this embodiment, the consumption meter needs not have a radio signal transmitter, such as a VHF or UHF radio signal transmitter. Instead it needs only have an NFC facility, which is far simpler and cheaper than radio signal transmitters.

Consumption meters with no radio signal transmission facility may be used with utility networks where there is no need for radio communication from the consumption meters. Such networks may be networks with different communication schemes, such as networks based on walk-by reading of consumption meters, or it may be networks with an existing communication facility, such as networks, where battery-powered consumption meters such as water meters are connected to other consumption meters such as electricity meters, which are not battery-powered, and which have their own radio signal transmitter, and which may act as communication gateways or repeaters for the battery-powered consumption meters.

According to a preferred embodiment of the invention the consumption meter further comprises a second communication means, which is a communication means for communication in normal operation mode for transmitting the consumption meter representation from the consumption meter by long range communication. Such second communication means, also referred to as second communication interface, may be radio communication means, such as a VHF or UHF radio signal transmitter as known in the art. Such communication means are long range communication means, ranging from tens or hundreds of meters to several kilometers, as compared to the NFC means in the sub-meter range.

Being provided with such dual communication means, the battery-powered consumption meter may advantageously communicate via the first communication means in the calibration mode and via the second communication means in normal operation mode. As the first communication means, as described above, may be powered by the external device, no energy is consumed for communication purposes from the battery of the battery-powered consumption meter in the calibration mode; only when in the normal operation mode, energy is consumed from the battery of the battery-powered consumption meter for communication purposes, thus providing savings of battery energy as well as a higher level of control of the battery energy management.

In another aspect of the invention a battery-powered consumption meter is provided, which has at least two modes of operation comprising a normal operation mode and a calibration mode different from the normal operation mode, the consumption meter comprising a measurement means for measuring a value relating to an accumulated volume of a fluid flowing in a connected fluid pipe system to make up a consumption meter representation of the accumulated volume, and a first communication means, which is a wireless two-way communication means for communication in calibration mode arranged for transmitting the consumption meter representation from the consumption meter to an external device external to the consumption meter, and for receiving a communication therefrom, wherein the first communication means comprises near field communication means.

As with the consumption meter according to the first aspect of the invention, the advantages of the consumption meter according to the second aspect of the invention using NFC when in the calibration mode may be, among others, energy saving and/or elimination of any need for radio signal transmission facilities.

As with the consumption meter according to the first aspect of the invention, the consumption meter according to the second aspect of the invention may as well have long range second communication means in addition to the first communication means, the second communication means for communication in the normal operation mode.

In an embodiment of the invention according to both of the first and the second aspects thereof, the consumption meter comprises an internal clock, and the consumption meter representation comprises corresponding values of time and accumulated volume obtained by the consumption meter.

Thus, according to this embodiment, the consumption meter representation comprises, in additional to information relating to the accumulated volume as above, information relating to the corresponding time relating to the accumulated volume.

In the context of this embodiment, it should be understood that the consumption meter representation may comprise a first and a second sets of corresponding time and accumulated volume, or it may comprise a corresponding time interval and accumulated volume difference between the first and the second sets of corresponding time value and accumulated volume.

Thus, per example, a consumption meter representation may comprise, that at time $t1=1$ min., the accumulated volume is $V1=2.00$ liters, and that at time $t2=3$ min., the accumulated volume is V2=12.00 liters, or, per the same example, the consumption meter representation may comprise that during the time interval t2−t1=2 min., the accumulated volume difference is V2−V1=10.00 liters. Of course, the time interval and accumulated volume difference correspond to the difference between the times and accumulated volumes of the first and second sets, respectively.

The time data from the consumption meter may be used for correlating a consumption meter representation and a reference device representation, which do not relate to the same time interval, in terms of overlap and/or in terms of duration.

Preferably, the time-wise overlap between the consumption meter time interval and the reference device time interval should be as high as possible, such as the consumption meter time interval preferably overlapping the reference device time interval by at least 20% thereof, preferably by at least 50% thereof, more preferably by at least 80% thereof, even more preferably by at least 90% thereof.

Per example, in case the reference device time interval ranges from t1=2 min. to t2=12 min., a consumption meter time interval ranging from t1=10 min. to t2=15 min. overlaps the reference device time interval by 20% thereof. Similar, a consumption meter time interval ranging from t1=7 min. to t2=15 min. overlaps the reference device time interval by 50% thereof. Additionally, with consumption meter intervals ranging from t1=4 min. to t2=15 min., and from t1=3 min. to t2=15 min., the overlap is 80% and 90%, respectively.

Also preferably, each of the consumption meter time interval and the reference device time interval have an interval duration, and the consumption meter time interval duration preferably deviates from the reference device time interval duration by less than 10%, preferably by less than 5%.

Per example, in the case of the reference device time interval ranging from t1=2 min. to t2=12 min., i.e. of a duration of 10 min., consumption meter time intervals ranging from t1=3 min. to t2=12 min., i.e. of a duration of 9 min., and from t1=2½ min. to t2=12 min., i.e. of a duration of 9½ min., deviate from the reference device time interval in terms of duration by 10%, and 5%, respectively.

Per example, a consumption meter representation relates to an accumulated volume difference V2−V1=10.20 liters measured during a time interval t2−t1=4 min. Further per this example, the reference device representation comprises an accumulated volume difference V2−V1=5.00 liter measured during a time interval t2−t1=2 min. For calibration, an accumulated volume of the consumption meter corresponding to the duration of the reference device time interval is calculated: (V2−V1)'=5.10 liters during (t2−t1)'=2 min., corresponding to V2−V1=10.20 liters during t2−t1=4 min. Now, with the duration of the consumption meter time interval and of the reference device time interval being similar, the accumulated volumes may be compared, i.e. 5.10 liters vs. 5.00 liters, and it may be determined that the reading of the consumption meter exceeds the reading of the reference device by 2.0%. This is the result of the calibration. Subsequently, the consumption meter reading may in turn be adjusted, i.e. reduced by 1.96%.

In a preferred embodiment of the invention the consumption meter comprises registration means for registration of a communication from the external device at the time of the communication from the external device.

According to this embodiment of invention the external device communicates with the consumption meter, and the consumption meter has registration means for registration of the communication from the external device at the time thereof. Accordingly, the consumption meter is arranged to register the communication from the external device at the time of the communication from the external device.

In the context of this embodiment of the invention the registration means is understood as an arrangement of the consumption meter, which per se registers that the communication took place, such as a clock registering the time of communication, or it may be means, which performs an action as a consequence of the communication, such as means executing a measurement or a transmission as a consequence of the communication.

Also in the context of this embodiment it should be understood that the communication from the external device may be the request for transmission of a consumption meter representation, such as a request for transmission of a consumption meter representation based on the latest measurement of the accumulated volume made by the consumption meter. Such transmission may be done immediately at the time of the communication, or at a later stage, as requested.

Alternatively the communication from the external device may be a request for transmission of a consumption meter representation based on a later measurement of the accumulated volume to be made by the consumption meter.

Further alternatively, the communication from the external device may be another communication than a request for transmission of a consumption meter representation. Thus, the communication from the external device may be a "wake-up signal" or a "tap-on-the-shoulder signal" such as an unmodulated carrier wave to alert the consumption meter and bring it into an activated state, such as in a state of measurement or a state of transmission.

In a further preferred embodiment of the invention the registration means comprises means for registration of the accumulated volume at the time of the communication from the external device.

Thus, beyond alerting the consumption meter and bringing it into an activated state upon receipt of the communication from the external device, the registration means further comprises means for registration of the accumulated volume at the time of the communication from the external device.

In the context of this embodiment it should be understood that the registration of the accumulated volume at the time of the communication from the external device may be a registration of the latest value of the accumulated volume made by the consumption meter or it may be a registration of a later value of the accumulated volume to be made by the consumption meter.

Alternatively, "the accumulated volume at the time of the communication from the external device" may comprise an interpolated value of the accumulated volume, such as an interpolated value between the latest value of the accumulated volume at the time of the communication and a later value of the accumulated volume measured by the consumption meter.

In a further preferred embodiment of the invention, the consumption meter has an internal clock, and the registration means comprises means for registration of the time of the consumption meter at the time of the communication from the external device.

The time registered by the consumption meter by means of the internal clock at the time of the communication from the external device may then be used as described above for correlating a consumption meter representation and a reference device representation, which do not relate to the same time interval.

Additionally, the time registered by the consumption meter by means of the internal clock at the time of the communication from the external device may be used for interpolation purposes. Thus, in an embodiment of the invention the consumption meter comprises interpolation means for making up a consumption meter representation corresponding to the time of the communication from the external device from a set of values of the accumulated volume measured previously and subsequently, respectively, to the time of the communication from the external device. The interpolation means, or interpolator, or interpolation processor, may for example be implemented by a microprocessor, preferably a processor shared with the measuring means.

Thus, per example, the consumption meter makes two measurements of the accumulated volume, one at $t1=1$ min. and one at $t2=3$ min., both of $t1$ and $t2$ being registered by means of the internal clock of the consumption meter. At time $t1=1$ min., the accumulated volume is $V1=2.00$ liters, and at time $t2=3$ min., the accumulated volume is $V2=12.00$ liters. Assuming now that the communication from the external device is registered at $treg=1½$ min. Thus, even though no specific measurement of the accumulated volume was made at $treg=1½$ min., by interpolation between $t1$ and $t2$, and between $V1$ and $V2$, an estimate of the accumulated volume at $treg=1½$ min. may be found as $Vreg=4.50$ liters, and a consumption meter representation relating to $treg$ comprising $treg=1½$ min. and $Vreg=4.50$ liters may be made up. For calibration this consumption meter representation may be compared to a reference device representation.

In a preferred embodiment of the invention the consumption meter comprises storage means for storage of the consumption meter representation.

Thus with this embodiment the consumption meter has storage means, also referred to as memory, for storage of consumption meter representations, the so-stored consumption meter representation being arranged with the storage means for transmission to the external device.

According to the invention, the storage means may comprise one or more consumption meter representations. Thus the storage means may comprise one consumption meter representation only, such as the at any time latest consumption meter representation made up from the latest measurement of the accumulated volume by means of a principle of continuously overwriting the previous consumption meter representation. Alternatively, the storage may comprise more consumption meter representations, such as the latest two, three, four, five, ten, twenty or more representations made up, or it may comprise a selection of the representations, such the latest representation made up, as well as every fifth or every tenth representation made up.

The storage means may be a non-volatile storage means, preferably a solid state storage medium such as various types of Flash memory, e.g. an electrically erasable programmable read-only memory (EEPROM) means or a non-volatile random-access memory (NV-RAM) means. Alternatively, the storage means may be a volatile storage means, such as a random-access memory (RAM) means, which can only hold data when powered, and therefore needs continuous powering by the consumption meter.

According to a third aspect of the invention a calibration system for a battery-powered consumption meter is provided, which comprises the consumption meter, an external device, a reference device and a fluid pipe system, wherein the consumption meter and the reference device are arranged sequentially in any order with the fluid pipe system to allow a flow of fluid through the fluid pipe system, the consumption meter and the reference device, and wherein the consumption meter comprises a measurement means for measuring a value relating to an accumulated volume of the fluid to make up a consumption meter representation of the accumulated volume, and a first communication means, which is a wireless two-way communication means arranged for transmitting the consumption meter representation from the consumption meter to the external device, and for receiving a communication therefrom, and wherein the consumption meter has at least two modes of operation comprising a normal operation mode, and a calibration mode different from the normal operation mode, wherein the reference device is arranged for transmitting a reference device representation relating to an accumulated volume of the fluid made up by the reference device to the external device, and wherein the external device is arranged to establish a calibration result for the consumption meter on the basis of the consumption meter representation and the reference device representation, and wherein the consumption meter in calibration mode is arranged to transmit the consumption meter representation to the external device in response to a request therefor from the external device.

Also, according to a fourth aspect of the invention, a calibration system for a battery-powered consumption meter is provided, which comprises the consumption meter, an external device, a reference device and a fluid pipe system, wherein the consumption meter and the reference device are arranged sequentially in any order with the fluid pipe system to allow a flow of fluid through the fluid pipe system, the consumption meter and the reference device, and wherein the consumption meter comprises a measurement means for measuring a value relating to an accumulated volume of the fluid to make up a consumption meter representation of the accumulated volume, and a first communication means, which is a wireless two-way communication means arranged for transmitting the consumption meter representation from the consumption meter to the external device, and for receiving a communication therefrom, and wherein the consumption meter has at least two modes of operation comprising a normal operation mode, and a calibration mode different from the normal operation mode, wherein the reference device is arranged for transmitting a reference device representation relating to an accumulated volume of the fluid made up by the reference device to the external device, and wherein the external device is arranged to establish a calibration result for the consumption meter on the basis of the consumption meter representation and the reference device representation, and wherein the first communication means comprises near field communication means.

It should be understood that the third and fourth aspects relate to calibration systems for calibration of the consumption meter according to the first and second aspects, respectively.

With each of the calibration systems of the third and fourth aspects, the system comprises, in addition to the consumption meter of the first and second aspects, respectively, an external device, a reference device and a fluid pipe system.

As with the first and second aspects, with the third and fourth aspects, the external device makes up an interface to the consumption meter during calibration, and controls the calibration of the consumption meter per se. With the calibration system of the third and fourth aspects, the external device additionally controls the reference device, which along with the consumption meter under calibration, is arranged with the fluid pipe system, so that the fluid flowing therein passes both of the consumption meter and the reference device.

As with the consumption meter according to the first and second aspects making up consumption meter representations, the reference device of the calibration system according to the third and fourth aspects makes up reference device representations comprising measures of accumulated volumes measured by the reference device, or corresponding values of time and accumulated volumes measured by the reference device. Such reference device representations are subsequently compared to consumption meter representations for establishment of a calibration result for the consumption meter as described above.

In a preferred embodiment the external device is arranged to communicate with the consumption meter and to register the communication at the time thereof. Further with this embodiment, the consumption meter comprises registration means for simultaneous registration of the communication from the external device.

In the context of this embodiment of the invention the term "to register" is understood as the action of per se registering that the communication took place, such as registering the time of communication, or to perform an action as a consequence of the communication, such as executing a measurement or a transmission in consequence of the communication.

As described above, the consumption meter has registration means for registration of the communication from the external device at the time of the communication, for example a request for transmission of a consumption meter representation or a wake-up signal in terms of an unmodulated carrier wave. This registration is made simultaneous to the registration by the external device of the communication.

With this embodiment of the invention, assume that upon initiation of the calibration session, the consumption meter has been arranged in its calibration mode, making measurements of the accumulated volume at predetermined intervals.

For the start of the calibration session, the external device communicates with the consumption meter under calibration by transmitting an unmodulated carrier wave to the consumption meter. This communication is registered with the external device and simultaneously with the consumption meter.

The external device now requests that the reference device immediately measures the accumulated volume and makes up a corresponding reference device representation at the time of the communication. This first reference device representation may be transmitted to external device.

Once the communication has been registered by the consumption meter, the consumption meter "wakes up", preparing to make up a consumption meter representation corresponding to the time of the communication.

This consumption meter representation may be made up from the latest measurement of the accumulated volume at the time of the communication, the subsequent measurement of the accumulated volume at the time of communication, or by interpolation therebetween. This first consumption meter representation may be transmitted to the external device.

It will be recognized that with this embodiment of the invention, synchronized or absolute time internal clocks of the consumption meter and the external device are not needed. Essential is only, that the registration of communication from the external device to the consumption meter is made simultaneously by the external device and the consumption meter; in this way, the representations from the consumption meter and the reference device relate to the same time and may be used for the calibration.

The procedure is repeated at the end of the calibration, and each of a second consumption meter representation and a second reference device representation may be transmitted to the external device.

Alternatively to transmitting each of the first and second consumption meter representations separately, and each of the first and second reference device representations separately, the differences between the first and second consumption meter representations, and between the first and second reference device representations, respectively, may be calculated by the consumption meter and the reference device, respectively, and subsequently transmitted to the external device.

According to this embodiment of the invention involving registration of a communication from the external device and interpolation between an earlier and a subsequent measurement, it should be understood that the transmission of the consumption meter representation does not have to be made immediately at time of the registration of communication. Instead the transmission of the consumption meter representation may be done at any time after the subsequent measurement.

Preferably the consumption meter has an internal clock for interpolation purposes as described above.

In a preferred embodiment of the invention the external device is arranged to register the time of the communication. Also it may further be arranged to establish the calibration additionally on the basis the time of the communication.

With this preferred embodiment, the external device has an internal clock and registers the time of the communication, as an alternative or supplement to time registration by the consumption meter.

Registration of the time of the communication by the external device has the advantage over time-registration by the consumption meter that calibration of internal clocks of external devices is far easier and less costly than calibration of internal clocks of consumption meters.

In this context it should be understood, that in case time registration is involved with the calibration, and time values are comprised with the representations, whether from the consumption meter or from the reference device, it is essential that such time registrations are correct or at least calibrated. If not, the calibration may be wrong.

Accordingly, assume a calibration of a consumption meter is made based on a reference device representation of a—correct—reference device time interval of $t2-t1=10$ min. and a corresponding accumulated volume of $V2-V1=4$ liters, and a consumption device representation involving an—immediate—consumption meter time interval of $t2-t1=15$ min and a corresponding accumulated volume of $V2-V1=6$ liters. For the calibration, an accumulated volume of the consumption meter corresponding to the 10 min. duration of the reference device time interval is calculated, which is $(V2-V1)'=4$ liters. Immediately, the accumulated volumes of the reference device and the consumption meter are similar, and the reading of the consumption meter is correct: this is the immediate result of the calibration.

Assume now, however, that the internal clock of the consumption meter is not calibrated, and that from a subsequent calibration of the internal clock of the consumption meter it is discovered that the clock of the consumption meter goes too fast by 25%: during every 4 minutes interval, the reading of the internal clock of the consumption meter is 5 minutes. The correct duration of the above consumption meter time interval is therefore not 15 min. as immediately registered. Instead, the correct duration of the consumption meter interval is 12 min., and for the calibration, the correct accumulated volume corresponding to the 10 min. duration of the reference device time interval is not (V2−V4=4 liters. Instead it is 5 liters. Thus, instead of being correct, the actual reading of the consumption meter exceeds the reading of the reference device by 25%, corresponding to the relative error of the internal clock of the consumption meter.

Of course, once an internal clock of a consumption meter going too fast or too slow is calibrated, it may be relied upon for purposes of calibration of consumption meters in terms of accumulated volume, whether adjusted or not.

Still, however, eliminating the need for calibration of internal clocks of consumption meters is advantageous, as consumption meters are produced in thousands, or even in tens of thousands for large utility networks, and calibration of the internal clocks of such high numbers of individual consumption meters is highly costly.

While produced in thousands, each calibration session typically involves only tens or a few hundreds of consumption meters, and at maximum a similar number of external devices, dependent on whether an external device may operate one consumption meter only or a number of consumption meters.

Therefore it is far easier and less costly to arrange to calibrate internal clocks of the external device(s) used with the calibration instead of calibration of the internal clocks with the larger number of consumption meters.

It should be understood, that even though the internal clock of a consumption meter may go too fast or too slow, the above interpolation between a latest and a subsequent measurement of the accumulated volume is still correct, as clock errors are ruled out with the interpolation.

In an alternative embodiment of the invention the calibration system comprises synchronization means, also referred to as a time synchronizer, for synchronizing the time values of the consumption meter and the time values of the reference device, such as synchronizing relative to radio-based shortwave or longwave standard time signals, e.g. the German DCF77 signal, the British MSF signal, the Canadian CHU signal, etc., or relative to other standard time references such as GPS-derived time, a Network Time Protocol-derived time such as from an Internet time server, etc. Such synchronization makes up a continuous calibration of any internal clocks of the consumption meter and the external device.

With this embodiment disadvantages related to consumption meter calibration involving internal clocks and times which are not calibrated are eliminated.

According to a fifth aspect of the invention, a method of calibration of a battery-powered consumption meter is provided, wherein the consumption meter has first communication means, which is two-way wireless communication means, the method comprising the steps of: arranging sequentially the consumption meter and a reference device in any order with a fluid pipe system to allow a flow of fluid through the consumption meter and the reference device; providing an external device in wireless two-ways communication with the consumption meter and in communication with the reference device; making, by the external device, the consumption meter, which is arranged to operate in accordance with at least a normal operation mode and a calibration mode different from the normal operation mode, change to the calibration mode to measure a value relating to an accumulated volume of the fluid to make up a consumption meter representation of the accumulated volume; transmitting by the consumption meter to the external device the consumption meter representation; transmitting by the reference device to the external device a reference device representation relating to an accumulated volume of the fluid made up by the reference device; establishing, by the external device, a calibration result for the consumption meter on the basis of the consumption meter representation and the reference device representation, wherein the step of transmitting the consumption meter representation is done in response to a request therefor from the external device.

According to a sixth aspect of the invention, a method for calibration of a battery-powered consumption meter is provided, wherein the consumption meter has first communication means, which is two-way wireless communication means, the method comprising the steps of: arranging sequentially the consumption meter and a reference device in any order with a fluid pipe system to allow a flow of fluid through the consumption meter and the reference device; providing an external device in wireless two-ways communication with the consumption meter and in communication with the reference device; making, by the external device, the consumption meter, which is arranged to operate in accordance with at least a normal operation mode and a calibration mode different from the normal operation mode, change to the calibration mode to measure a value relating to an accumulated volume of the fluid to make up a consumption meter representation of the accumulated volume; transmitting by the consumption meter to the external device the consumption meter representation; transmitting by the reference device to the external device a reference device representation relating to an accumulated volume of the fluid made up by the reference device; establishing, by the external device, a calibration result for the consumption meter on the basis of the consumption meter representation and the reference device representation, wherein the transmission of the consumption meter representation is conducted by means of near field communication.

The fifth and sixth aspects relate to methods of calibration of the consumption meter according to the first and second aspects, respectively, and for calibration of consumption meter of the calibration system according to the third and fourth aspects, respectively.

In a preferred embodiment according to any of the fifth and sixth aspects, the step of transmitting by the consumption meter to the external device the consumption meter representation is done independently of the step of the consumption meter measuring a value relating to an accumulated volume of the fluid.

According to this embodiment it should be understood, that in the calibration mode, the consumption meter continuously, at predetermined intervals, measures the accumulated volume of the fluid to make up consumption meter representations of the accumulated volume, and, compared to the normal operation mode, in the calibration mode the intervals are shorter.

According to this embodiment, it should further be understood that the transmission of the consumption meter representation from the consumption meter to the external device may be done independently of the step of measuring. Thus, the consumption meter uninterruptedly continues measuring accumulated volumes while the consumption meter representation is transmitted to the external device, and the first communication means of the consumption meter is arranged therefore.

According to another embodiment of the methods of both of the fifth and sixth aspects of the invention the consumption meter comprises an internal clock, and wherein the consumption meter representation comprises corresponding values of time and accumulated volume obtained by the consumption meter.

With this embodiment, consumption meter representation may be compared with reference meter representations, even though the duration involved with each of the representations are not similar.

According to a preferred embodiment of the invention, the method according to any of the fifth and sixth aspects of the invention comprises the further steps of: the external device communicates with the consumption meter to initiate or terminate a calibration session and registers the communication at the time thereof; and the consumption meter simultaneously registers the communication from the external device.

According to another preferred embodiment of the invention the external device registers the time of the communication, preferably by means of an internal clock of the external device.

THE DRAWINGS

Figure 2:
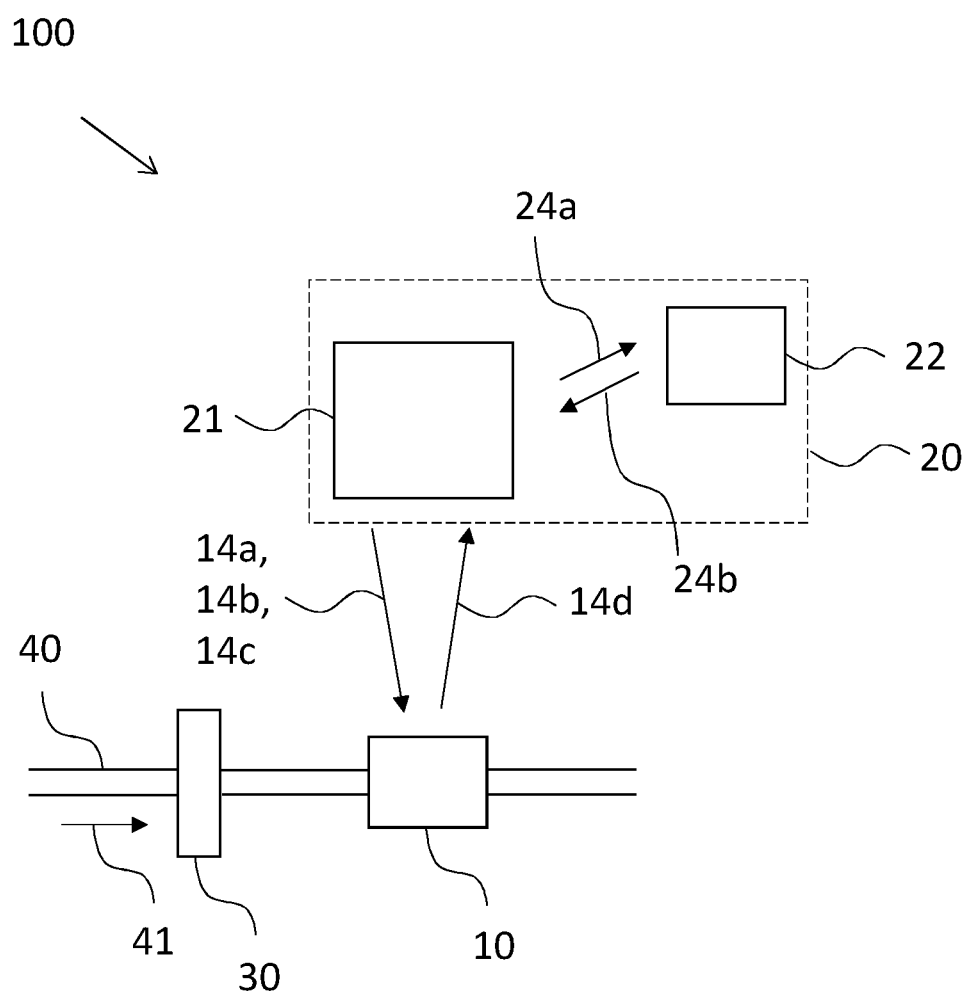
Figure 3A:
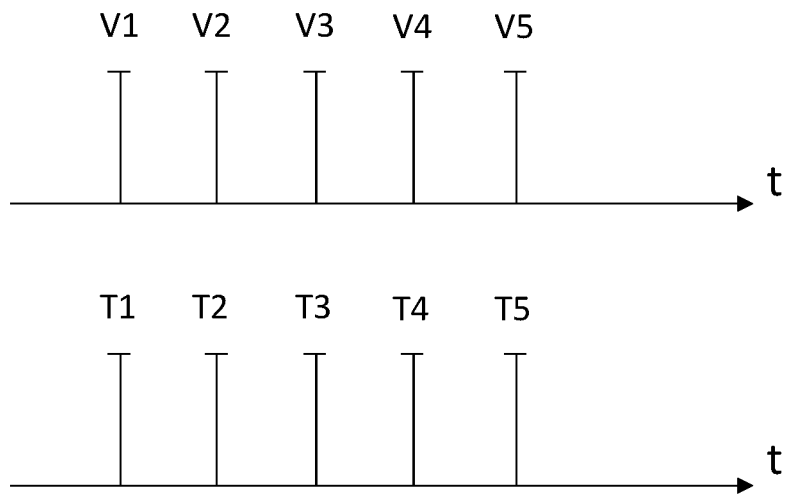
Figure 3B:
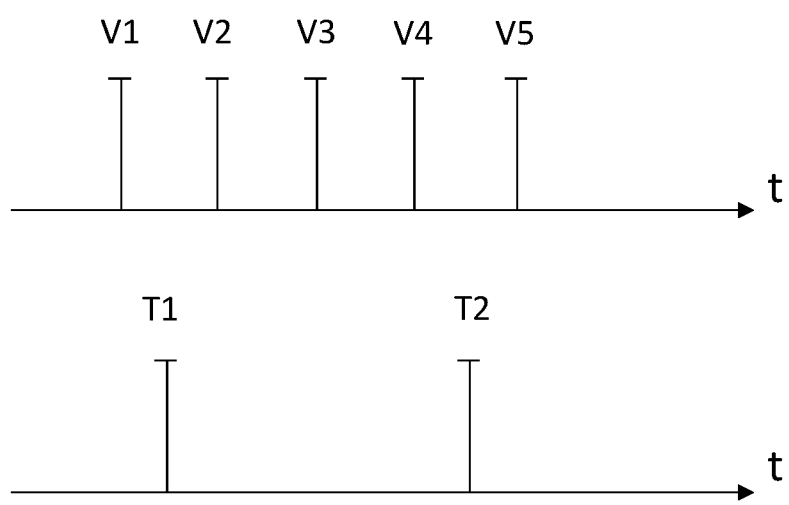
Figure 4:
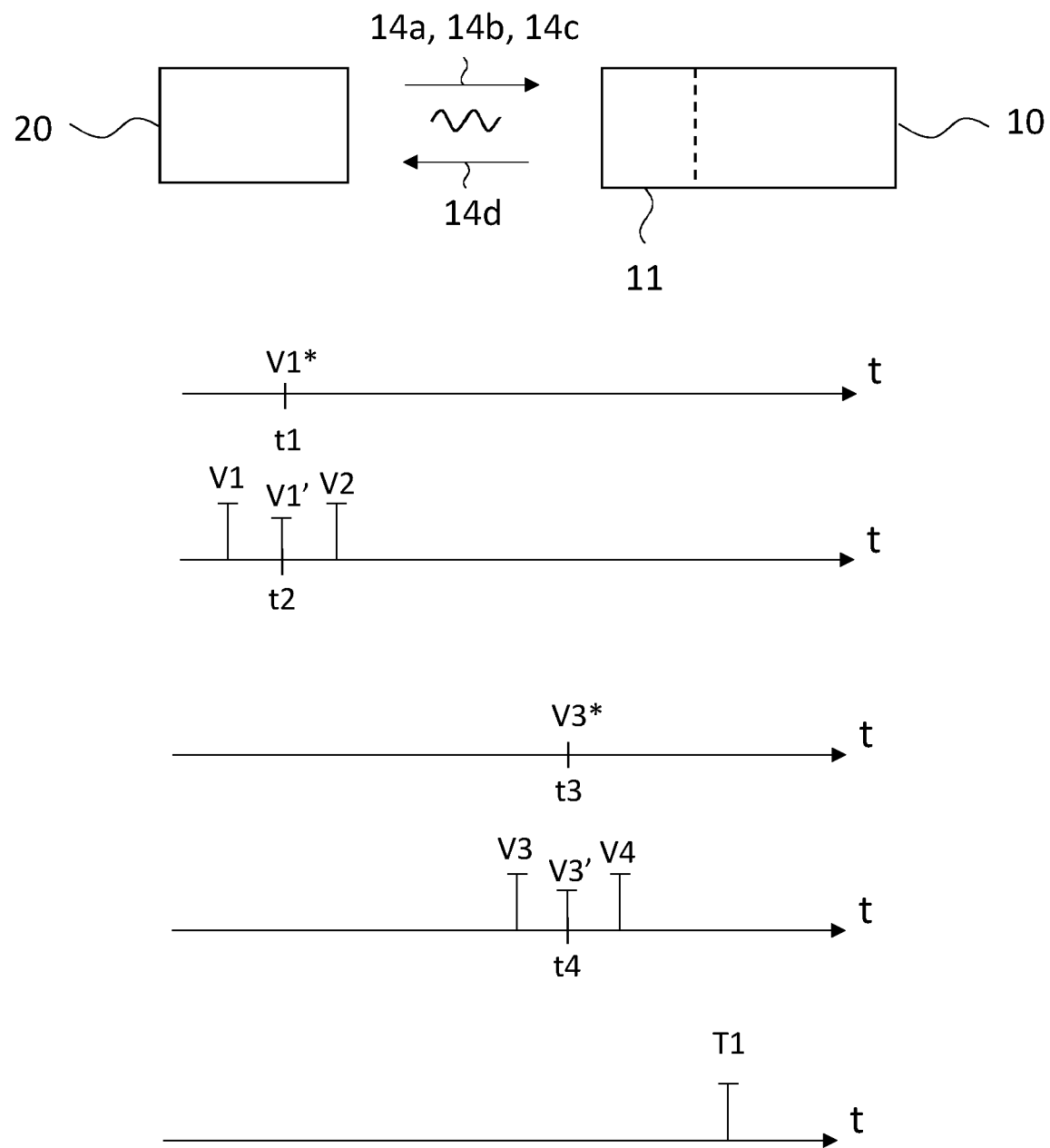

In the following, the invention is described in more detail with reference to the drawings, where FIG. 1 shows a consumption meter according to an embodiment of the present invention, FIG. 2 shows a schematic illustration of an embodiment of a calibration system according to the invention, FIG. 3a shows a prior art communication scheme between a consumption meter and a calibration system, FIG. 3b shows a communication scheme between the consumption meter and the calibration system according to an embodiment of the present invention, and FIG. 4 shows another communication scheme between the consumption meter and the calibration system according to an embodiment of the present invention.

DETAILED DESCRIPTION

FIG. 1 shows a wireless consumption meter 10 according to an embodiment of the invention. It is configured to be connectable to a fluid pipe 40 so as to be able to perform its measuring method on the fluid in the fluid pipe 40, by letting the fluid flow through a piece of pipe integrated with the consumption meter 10 and allowing ultrasonic transceivers to gain access to the fluid. The wireless consumption meter 10 comprises a battery for powering purposes, and a measurement means, also referred to as flow metering part, for performing the flow measuring.

The consumption meter further comprises first communication means (11, not shown in FIG. 1), also referred to as first communication interface, in terms of a storage with an NFC interface (not shown) for consumption meter representations, which may be read by a corresponding NFC interface of an external device (20, not shown in FIG. 1).

The consumption meter preferably further comprises second communication means, also referred to as second communication interface, in terms of a VHF or UHF radio signal transmitter (not shown), which may be used for transmission of data packages related to normal operation volume measurements, such as if the consumption meter is arranged in a pit at the premises of an end-user.

FIG. 2 illustrates schematically a calibration system 100 according to an embodiment of the invention. The fluid pipe 40 facilitates a fluid flow as indicated by arrow 41 through the calibration system 100.

The consumption meter 10 under calibration is coupled to the fluid pipe 40 and arranged to measure a value representing a fluid passing through the fluid pipe 40 in terms of an accumulated volume of the fluid. The fluid may be water, hot water for district heating, or gas.

Also arranged in connection with fluid pipe 10 is a reference device 30 configured to measure a reference value in terms of the accumulated volume of the fluid flowing through the fluid pipe 40. The reference device 30 may e.g. be a pre-calibrated consumption meter provided as a separate device or integrated with the external device 20, or it may be another device, such as a simple bucket, which by means of for instance weight measurements or volume indications is able to meter very accurately the accumulated volume of the fluid flow. The measured reference value is used for calibration of consumption meter 10.

The calibration system 100 further comprises a calibration box 21 and a common control unit 22, which together make up an external device 20 according to the invention. The calibration box 21 communicates (14a, 14b, 14c, 14d) with the consumption meter, and the common control unit 22 communicates (24a, 24b) with the calibration box 21.

FIG. 3a shows a prior art communication scheme between a consumption meter and a calibration system, according to which the consumption meter, when in its calibration mode, repeatedly transmits consumption meter representations with its latest measured accumulated volume by means of radio communication, such as by VHF or UHF radio signal transmission. Thus, with the calibration mode, the consumption meter repeatedly tweets its consumption meter representations by "tweet-tweet-tweet tweet-tweet"-ing.

Thus, with the prior art, the consumption meter repeatedly measures the accumulated volume, here in terms of five consumption meter representations of accumulated volumes V1, V2, V3, V4, and V5 on a time-scale. As shown on a similar time scale, each of the five representations are transmitted from the consumption meter in terms of transmissions T1, T2, T3, T4, and T5, each representing a consumption meter representation. Each transmission Tx is made by radio signal transmission immediately upon the completion of the consumption meter representation Vx. An accumulated volume difference for calibration purposes may be calculated from the difference between Vx-values, such as V4-V1.

FIG. 3b shows a communication scheme between the consumption meter 10 and the calibration system 100 according to an embodiment of the invention, according to which the consumption meter 10, when in its calibration mode, transmits its consumption meter representations only when requested by the calibration box 21, i.e. only upon request from the calibration box 21. The transmission is made up of a single "tweet" when the calibration box 21 with its NFC interface is arranged close, such as within 10-20 cm, to the consumption meter 10 with its NFC interface to "request" the transmission, and the consumption meter representation is transmitted by NFC from the consumption meter 10 to the calibration box 21.

Accordingly, the consumption meter 10, as with the prior art, repeatedly measures the accumulated volume, her in terms of five representations V1, V2, V3, V4, and V5 on a time scale, and stores them in a storage means, also referred to as memory, e.g. flash memory, of the consumption meter. As shown on a similar time scale, the results of these representations are not immediately transmitted as with the prior art. Instead, upon request from the external device 20, a consumption meter representation involving V1 is transmitted as T1 at some point during the time interval between the measurement of V1, and a subsequent measurement, V2. Likewise, upon request from the external device 20, another consumption meter representation involving V4 is transmitted as T2 at some point during the time interval between the measurement of V4, and a subsequent measurement, V5. An accumulated volume difference for calibration purposes may be calculated from the difference between these Vx-values, V4-V1.

FIG. 4 shows another communication scheme between the consumption meter 10 and the calibration system 100 according to an embodiment of the present invention.

With the embodiment of FIG. 4, at the start of the calibration session, the external device 20 communicates at time t1 with the consumption meter 10 by transmitting an unmodulated carrier wave 14a to the NFC interface 11 of the consumption meter 10. This communication 14a is a wake-up call to the consumption meter 10.

At the time t1 of the communication 14a, the external device 20 also requests a reference device representation with the accumulated volume V1* from the reference device. This reference device representation is made up by the reference device from a measurement of the accumulated volume made immediately at the time of communication 14a.

Upon receipt of the communication 14a, the consumption meter 10 simultaneously registers the time thereof, t2. Thus, t1 and t2 are identical.

It should be understood, that the consumption meter 10 most likely has not made a measurement of the accumulated volume right at time t2, as the consumption meter does not know when to expect to receive the communication 14a from the external device 20. Instead, the consumption meter 10 makes up a consumption meter representation corresponding to t2, V1', by interpolation between the accumulated volumes V1 and V2 measured previously and subsequently to t2. V1' therefore corresponds to V1*, volume-wise as well as time-wise. The interpolation may be carried out by an interpolating processor, also referred to as interpolator or interpolation means, e.g. a microprocessor, preferably shared with the measuring means or flow metering part of the consumption meter.

The procedure is repeated at the end of the calibration session, the external device communicating 14b with the consumption meter 10 at time t3, and receiving the accumulated volume V3* from the reference device 30. At the consumption meter end, time t4 is registered simultaneously to time t3, and a consumption meter representation corresponding to time t4, V3', is made up by interpolation between V3 and V4. V3' corresponds to V3*, volume-wise as well as time-wise.

To complete the calibration, a consumption meter representation involving the accumulated volume difference V3'-V1' is calculated by the consumption meter 10, and communicated as communication 14d and T1 from the consumption meter 10 to the external device 20 upon request by communication 14c therefrom, and the measured accumulated volume difference V3'-V1' is compared to accumulated volume difference from the reference device 30, V3*-V1*.

In the following, embodiment E1 describes an additional possible embodiment of the invention:

E1: A method for calibration of a battery-powered consumption meter with first communication means, which is two-way wireless communication means, comprising the steps of: arranging sequentially the consumption meter and a reference device in any order with a fluid pipe system to allow a flow of fluid through the consumption meter and the reference device; providing an external device in wireless two-ways communication with the consumption meter and in communication with the reference device; making, by the external device, the consumption meter, which is arranged to operate in accordance with at least a normal operation mode and a calibration mode different from the normal operation mode, change to the calibration mode to measure a value relating to an accumulated volume of the fluid to make up a consumption meter representation of the accumulated volume; transmitting by the consumption meter to the external device the consumption meter representation; transmitting by the reference device to the external device a reference device representation relating to an accumulated volume of the fluid made up by the reference device; establishing, by the external device, a calibration result for the consumption meter on the basis of the consumption meter representation and the reference device representation; wherein the external device communicates with the consumption meter to initiate or terminate a calibration session and registers the communication at the time thereof; and wherein the consumption meter simultaneously registers the accumulated volume at the time of the communication from the external device.

In the context of the present specification it should be understood, that embodiments of the six aspects of the invention may be combined, even though such combination may not by specifically described. Thus, embodiments of the consumption meter of the first and second aspects may be combined with embodiments of the calibration system of the third and fourth aspects, and with embodiments of the method of calibration of the fifth and sixth aspects. Also, embodiments of the calibration system of the third and fourth aspects may be combined with embodiments of the method of calibration of the fifth and sixth aspects.

LIST OF REFERENCE SIGNS 10 consumption meter,
11 first communication means,
14a first wake up signal from external device to consumption meter,
14b second wake up signal from external device to consumption meter,
14c request from external device for transmission of representation,
14d transmission of consumption meter representation to external device,
20 external device,
21 calibration box,
22 common control unit,
24a, 24b communication between common control unit and calibration box,
30 reference device,
40 fluid pipe,
41 fluid flow,
100 calibration system,
Tx transmission of consumption meter representation,
Vx consumption meter representation of accumulated volume,
Vx* reference device representation of accumulated volume,
Vx' interpolated representation of accumulated volume,
tx a point in time.

The invention claimed is:
1. A battery-powered consumption meter comprising:
a flow metering part for measuring a value relating to an accumulated volume of a fluid flowing in a connected fluid pipe system to generate a consumption meter representation of the accumulated volume, a first communication interface comprising a wireless two-way communication interface arranged for transmitting the consumption meter representation from the consumption meter to an external device external to the consumption meter, and for receiving a communication from the external device, an internal clock, and an interpolation processor, the consumption meter having at least two modes of operation comprising:

a normal operation mode, and a calibration mode different from the normal operation mode;

wherein, in calibration mode, the consumption meter is arranged to:

receive, from the external device, a request for the consumption meter representation; and transmit, in response to the request, the consumption meter representation to the external device, wherein the consumption meter registers the communication from the external device at a time of the communication from the external device, wherein the internal clock registers the time responsive to receiving the request from the external device, and wherein the interpolation processor generates a consumption meter representation corresponding to the time of the communication from the external device from a set of values of the accumulated volume measured previously and subsequently, respectively, to the communication from the external device.

2. The consumption meter according to claim 1, wherein the first communication interface comprises a near field communication interface.

3. The consumption meter according to claim 1, wherein the consumption meter further comprises a second communication interface for communication in normal operation mode for transmitting the consumption meter representation from the consumption meter by long range communication.

4. The consumption meter according to claim 1, wherein the consumption meter comprises a memory for storage of the consumption meter representation.

5. The consumption meter according to claim 1, wherein the consumption meter is further arranged to measure the accumulated volume at the time of receiving the request from the external device.

6. The consumption meter according to claim 1, wherein the consumption meter comprises an internal clock, and wherein the consumption meter representation comprises corresponding values of time and accumulated volume determined by the consumption meter.

7. A calibration system for a battery-powered consumption meter, comprising a consumption meter, an external device, a reference device and a fluid pipe system, the consumption meter and the reference device being arranged sequentially in any order with the fluid pipe system to allow a flow of fluid through the fluid pipe system, the consumption meter and the reference device;

the consumption meter comprising:

a flow metering part for measuring a value relating to an accumulated volume of the fluid to make up a consumption meter representation of the accumulated volume, a first communication interface for transmitting the consumption meter representation from the consumption meter to the external device, and for receiving a communication from the external device, an internal clock, and an interpolation processor, the consumption meter having at least two modes of operation comprising:

a normal operation mode, and a calibration mode different from the normal operation mode;

the reference device arranged for transmitting, to the external device, a reference device representation relating to an accumulated volume of the fluid generated by the reference device; and the external device arranged to establish a calibration result for the consumption meter on the basis of the consumption meter representation and the reference device representation, wherein, in calibration mode, the consumption meter is arranged to transmit the consumption meter representation to the external device in response to a request for the consumption meter representation from the external device wherein the consumption meter registers the communication from the external device at a time of the communication from the external device, wherein the internal clock registers the time responsive to receiving the request from the external device, and wherein the interpolation processor generates a consumption meter representation corresponding to the time of the communication from the external device from a set of values of the accumulated volume measured previously and subsequently, respectively, to the communication from the external device.

8. The calibration system according to claim 7, wherein the external device is arranged to communicate with the consumption meter and to register the communication at the time thereof.

9. The calibration system according to claim 7, wherein the external device is arranged to register the time of the communication.

10. The calibration system according to claim 7, wherein the calibration system comprises a time synchronizer for synchronizing the time values of the consumption meter and the time values of the reference device.

11. The calibration system according to claim 7, wherein the first communication interface of the consumption meter comprises a near field communication interface.

12. The calibration system according to claim 7, wherein the consumption meter further comprises a second communication interface, which is a communication interface for communication in normal operation mode for transmitting the consumption meter representation from the consumption meter by long range communication.

13. A method for calibration of a battery-powered consumption meter with a two-way wireless communication interface, the method comprising the steps of:

receiving, by the battery-powered consumption meter and from an external device via the two-way wireless communication interface, a request for a consumption meter representation;

changing, by the consumption meter and responsive to the request, from a normal mode to a calibration mode to measure a value associated with an accumulated volume of a fluid, wherein the consumption meter is fluidically coupled to a fluid pipe system to allow the fluid to flow through the consumption meter and a reference device;

measuring, by the battery-powered consumption meter and based at least in part on the request, the accumulated volume of a fluid as the consumption meter representation of the accumulated volume;

transmitting, by the consumption meter to the external device, the consumption meter representation;

transmitting, by the reference device to the external device, a reference device representation relating to an accumulated volume of the fluid determined by the reference device;

establishing, by the external device, a calibration result for the consumption meter on the basis of the consumption meter representation and the reference device representation, wherein the consumption meter is configured to register the communication from the external device at a time of the communication from the external device;

wherein the consumption meter further comprises an internal clock, wherein the time is registered, using the internal clock, responsive to receiving the request from the external device; and wherein the consumption meter comprises an interpolation processor for generating a consumption meter representation corresponding to the time of the communication from the external device from a set of values of the accumulated volume measured previously and subsequently, respectively, to the communication from the external device.

14. The method according to claim 13, wherein the step of transmitting, by the consumption meter to the external device, the consumption meter representation is done independently of the step of the consumption meter measuring a value relating to the accumulated volume of the fluid.

15. The method according to claim 13, wherein the method comprises the further steps of:
the external device communicates with the consumption meter to initiate or terminate a calibration session and registers the communication at the time thereof; and
the consumption meter simultaneously registers the communication from the external device.

16. The method according to claim 13, wherein the method comprises the further step of:
the external device registers the time of the communication.

17. The method according to claim 13, wherein the first communication interface of the consumption meter comprises a near field communication interface.

18. The method according to claim 13, wherein the consumption meter further comprises
a second communication interface, which is a communication interface for communication in normal operation mode for transmitting the consumption meter representation from the consumption meter by long range communication.

* * * * *